June 8, 1965     C. R. YUNGKURTH     3,188,523

ELECTRICAL CIRCUIT MODULAR ASSEMBLY

Filed Dec. 6, 1961

INVENTOR.
CHARLES R. YUNGKURTH
BY
ATTORNEY

United States Patent Office

3,188,523
Patented June 8, 1965

3,188,523
ELECTRICAL CIRCUIT MODULAR ASSEMBLY
Charles R. Yungkurth, Endicott, N.Y., assignor to International Business Machines Corporation, New York, N.Y., a corporation of New York
Filed Dec. 6, 1961, Ser. No. 157,399
2 Claims. (Cl. 317—101)

The present invention relates to an electrical circuit modular assembly, and more particularly, to such an assembly having exceptional resistance to mechanical forces in the form of shocks and vibrations.

In the electrical and electronic arts a persisted problem of long standing has been that of providing circuits with adequate means for protecting them in environments where they are exposed to externally applied mechanical forces which act to disturb electrical connections and, in fact, may seriously damage the different circuit parameters themselves. It is clear that lacking such protective means the reliability of circuit operation can be considerably impaired. Of recent, this problem has been aggravated particularly in the case of circuits used in high-speed aircraft, missiles, and the like, where not only are such circuits encountering ever increasing forces and exotic vibrational ambient conditions, but also space and weight are at a premium in such applications thereby precluding the use of certain present known techniques and materials for dissipating the effects of adverse mechanical environmental forces.

Further in this connection, the technological evolution in electrical and electronic circuit components is in the direction of smaller and frequently more fragile structures, and, more important, satisfactory interconnection means for such small elements are accordingly of very small dimensions and relatively easily damaged.

Although a number of different methods of reducing the effects of vibrations and shocks are well-known, such as viscous damping, for example, in application to electrical and electronic circuits and circuit packages, the approaches have been primarily confined to two basic philosophies. First, in what might be termed the "soft" approach, the circuits are embedded in or surrounded by resilient or flexible materials, or external springlike isolators are provided and mechanical forces are reduced or absorbed by the materials or the isolators, as the case may be. In the second, or "hard" approach, a circuit is made substantially integral with a relatively stiff and inflexible material so that the component elements of the circuit are maintained in fixed physical relationship to one another despite subjection to mechanical forces.

Briefly, it is the contemplation of the invention to provide a circuit assembly consisting of at least one circuit module retained in a relatively inflexible base member in such manner as to afford the creation of frictional energy upon subjection of the assembly to externally applied mechanical forces whereby dissipation of these forces is effected.

It is therefore a primary object of the invention to provide a modular assembly in which individual modules have at least one frictional engaging surface.

A further object is the provision of such an assembly in which the application of mechanical forces causes the generation of frictional energy at the frictional engaging surfaces.

The foregoing and other objects, features and advantages of the invention will be apparent from the following more particular description of a preferred embodiment of the invention, as illustrated in the accompanying drawings.

It is a basic physical fact that when two surfaces are placed in contacting relation movement of one of the surfaces across the other, while maintaining the contacting relation, is opposed by a frictional force, or more commonly, friction. This force is oppositely directed to the force effecting the movement of the one body and is representable mathematically as, $$F = kN$$

where F is the frictional force, N is the normal force maintaining the surfaces in contact and $k$ is a constant factor dependent primarily on the material composing the surfaces and the condition of these surfaces. The frictional force so created immediately results in the irreversible production of heat energy, and it is upon this conversion to heat energy of a force tending to translate the surfaces relative to one another that the invention basically resides.

Assume now, for the purpose of explanation, that instead of single movement of the surfaces across one another a source of vibratory, or reciprocating, force is suitably aplied to one of the surfaces while maintaining the other surface in a fixed position. More particularly, assume a loaded coil spring is connected to one surface while the other is maintained in secured relation. Upon release, the first surface is moved back and forth across the second surface. It can be shown in this case that the amplitude of reciprocating translation is reduced by a factor of, $$4F/c \text{ per cycle}$$

where F is the frictional force between the surfaces and $c$ is a constant term associated with the physical properties of the spring. Accordingly, it is seen that for a certain amount of reciprocating energy applied to the surface the surface the envelope of the damped curve is essentially a straight line. It is, of course, clear that a limit to the vibratory motion exists and it is reached when the actuating force is reduced to a point less than that necessary to overcome the opposing frictional force, F.

Figure 1:
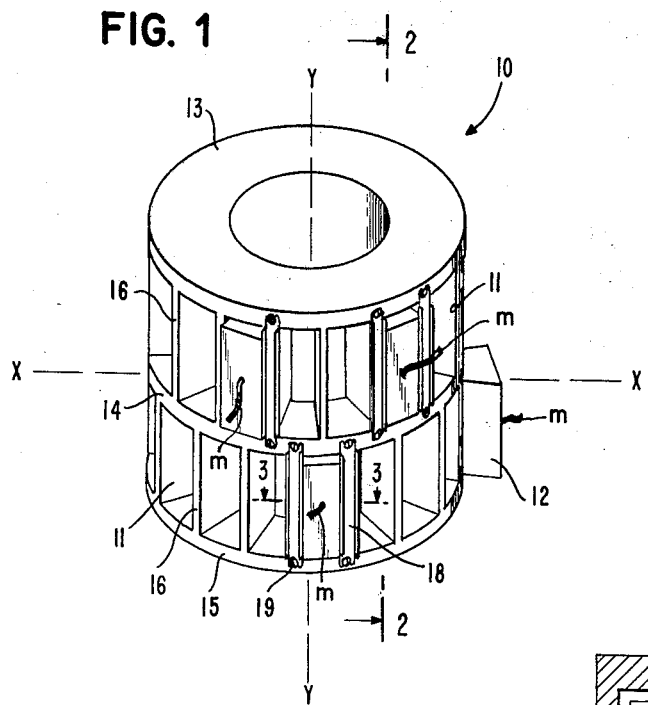
FIGURE 1 is a perspective view of one form of electric circuit assembly embodying the principles of the invention.

Referring now particularly to FIG. 1, there is shown a perspective view of one form of the circuit modular assembly of the invention. Broadly, it comprises a generally cylindrical base structure 10 having a plurality of individual receptacles, or wells, 11 opening outwardly from the curved surface portion and into which are received separate individual modules 12 containing electrical or electronic circuits of predetermined character. It is contemplated that connection to the circuits within the modules can be made in any one of a number of known ways, either from the outside of the assembly by cables m as shown best in FIG. 2, or by means of cables or other connector means internally of the assembly. It is felt, however, that for most purposes superior results are obtained with circuit connections made from the outside in that a more rigid integral structure of the base 10 is obtained since openings in the base for receiving cables are eliminated.

Before setting forth the detailed structure of the novel assembly it is to be noted that external vibrations and shocks as associated with this system can be broken down into components acting along two orthogonally related directions, namely, Y—Y the axis of the cylindrical base and X—X taken at 90-degrees to Y—Y. It is to be noted that the X—X axis is not meant to indicate a single line alone, but instead is representative of a pluarlity of planes passing transversely through the assembly and the Y—Y axis. As will be examined in greater detail below, forces exerted on the assembly along the Y—Y axis tend to promote translation of the base and the modules within the cells along directions parallel to Y—Y, while forces directed along X—X tend to flex the base structure also resulting in relative movement of the modules contained therein.

The base 10 can be made of any of a number of different materials with satisfactory results. However, it is considered best to use a material possessing a high degree of rigidity and structural strength, and, also, in view of the stringent weight requirements in missiles and aircraft applications, among others, it is desirable that this material have a relatively light weight. Either cast magnesium or aluminum provides a base which at the present time is felt to be an optimum structure with respect to the above conditons.

As to general structural features of the modules, they should be of a rigid one-piece construction for best results. Additionally, the outer surfaces of the modules, and particularly those surfaces that are to be frictionally engaged with the base, have a high coefficient of friction. The purpose and advantages of these requirements will be made more evident from the description that follows.

The base structure consists of disc-like supports 13–15 arranged in mutually spaced relation between the wells 11 which are thereby disposed in two sets, one above the other. By a comparative examination of FIG. 2 and FIG. 3, the individual wells 11 are seen to be of a generally wedge-shape when viewed in plan, or along a direction parallel to the Y—Y axis, with the broader part of the wedge located adjacent the outer surface of the base 10 and the narrower part inwardly. In particular, each cell is formed by a pair of spaced, flat walls 16 arranged between supporting discs 13 and 14 in the upper row and between the dicss 14 and 15 on the lower row, which walls form relatively wide openings at their outermost reaches and approach each other slightly on moving inwardly of the outer surface of the base thereby achieving the required wedge shape. Each of the walls 16 terminates at the innermost portion in a shell 17 which serves as a common wall for all of the wells and, of course, the base itself when considered in its entirety.

Moreover, it is important to note that the walls 16 defining the wells 11 of the upper set of the assembly are arranged in staggered relation to similar walls of the second, or lower, set so as to be mutually situated opposite the spaced portions intermediate the corresponding walls of the opposite set. This arrangement serves both to increase general structural strength and to provide some additional vibration and shock resistance.

As shown, the entire base is an integral structure, i.e., the walls 16, discs 13–15 and shell 17 are of a single cast construction. Although this one-piece structure approach is believed best for present purposes, it is contemplated that under certain circumstances the complete base could be a composite of individual parts assembled into integral form. And, in the latter case this is felt to be clearly within the ambit of the invention.

Figure 2:
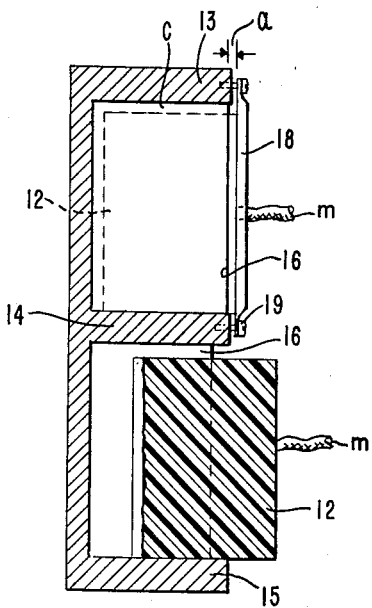
FIGURE 2 is an elevational, sectional, enlarged view through the assembly of FIG. 1 taken along line 2—2.
Figure 3:
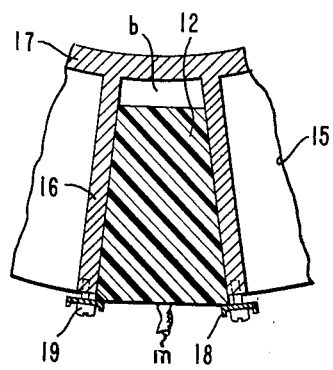
FIGURE 3 is a plan, sectional, enlarged view taken along line 3—3 of FIG. 1.

Still referring to FIGS. 2 and 3, each module is so dimensioned that when completely received within a well it has mating surfaces which internally contact the walls 16 on both sides in a wedged and frictional engaging manner. When fully received in this way, a small portion of the module, (a), extends beyond the extremities of the walls and the outermost portions of the appropriate discs 13–15. The purpose of this extension (a) is to permit gripping by securing means 18 which by means of screws 19 fixes the module securely within and to the base 10.

Moreover, to insure that a wedged condition can be obtained, the dimensions of the well and included module are such that a space (b) is provided between the shell 17 and the innermost portions of the modules when they are fully seated. Most importantly, as shown best in FIG. 2, the longitudinal dimensions of the module and containing well, i.e., as measured along a line parallel to Y—Y, are such that a space is provided between the module and at least one of the discs 13–15 forming the upper and lower walls of the well. Thus, if one portion of the module is in contact with say the disc 14 then the opposite portion of the module is maintained spaced from the disc 13, which space is indicated generally at (c) in FIG. 2.

In summary, when modules are received within the wells of the base 10 and completely seated with the securing means 18 in securing relation, they are restrained from translatory motions in the general direction of the axis X—X by the wedging of the corresponding mating surfaces of the modules with the walls 16. However, as to motion capabilities in the other directions, it is seen that sufficient force along Y—Y can cause movement of the modules within the cells of a translatory nature along this same axis. The required magnitude of such a motion inducing force being substantially that necessary to overcome the frictional force exerted on the side walls of the module as a consequence of their engagement with the walls 16 of the base.

Exemplary of operation, assume that an external vibratory or shock force is applied to the system along the axis Y—Y, and, more particularly, directed downwardly onto the system as it is represented in FIG. 1. This force will tend to move the base 10 in a downward direction if it is a steady force, and if it is vibratory a reciprocation of the base will be effected along the direction Y—Y. The frictional engagement of the walls 16 to the corresponding mating surfaces of the modules contained within the wells resists the externally imposed movement until a certain threshold force value is reached, above which slippage of the modules within the wells results. In accordance with the theoretical principles set forth above, this mutual movement, of slippage, of the modules causes a conversion of the frictional forces into heat energy. This heat energy represents a certain ratio of the external mechanical energy imposed upon the structure which has been converted from its mechanical destructive state to a form that is relatively harmless to the circuits contained within the modules.

A further important aspect of the described modular assembly is the protection it provides against vibrations and shock directed along line X—X (or other such mechanical forces having substantial components in this direction) tending to twist or flex the assembly and particularly the base relative to the axis Y—Y. When such a flexing or deformation of the base occurs there is an accompanying finite change in the lateral and longitudinal dimensions of the wells 11 relative to the included modules which, on the other hand, because of their rigid construction maintain their original geometry under wide ranges of externally applied forces. Deforming the base 10 and the walls 16 while maintaining the included modules in their original form necessitates slippage between the engaging surfaces of the base and modules. As before, this slippage is converted from the deleterious mechanical state in innocuous heat energy.

While it is true excessive amounts of heat can be equally detrimental to a circuit assembly as can, for example, vibration or shock, the quantities of heat which are generated here by the conversion of externally applied mechanical energy are of small magnitude relative to the heat normally associated with electrical circuits of this type. Also, good physical contact between the modules and the base allows the heat to be quickly dissipated throughout the entire system and thereby obviate the possibility of creation of localized areas of high temperature or "hot spot."

Further in this connection, the type of material composing the base structure 10 is important in that if possessed of a high thermal conductivity this will insure ready diffusion of generated heat energy and prevent confinement to the points of generation. Both aluminum and magnesium, which provide excellent base structures for other reasons, are also excellent in this regard.

Recapitulating on advantageous aspects of the invention, an electrical circuit modular assembly made in accordance with the principles described herein not only has the shock and vibration resistance properties ascribable to rigid structures due to the cast metal structure shown, but also the individual modules contained therein are substantially fixed in certain directions while having a capability for sliding, or slipping, against frictional engaging surfaces of the base in other directions. This enhances over-all performance by conversion of frictional forces to harmless heat energy resulting in effective dissipation of a substantial portion of the incident mechanical energy.

Although in the embodiment set forth herein as illustrative of the principle of the invention, a specific geometrical arrangement of the modules and support structure has been set forth offering advantages not only in the shock and vibration resistance areas, but also in regard to high module density, it is understood that for other purposes the disclosed structure can be varied in general structural relation from the specifics shown and still be consistent with the teachings of the invention.

While the invention has been particularly shown and described with reference to a preferred embodiment thereof, it will be understood by those skilled in the art that various changes in form and details may be made therein without departing from the spirit and scope of the invention.

What is claimed is:

1. A circuit modular assembly, comprising:
   a base of substantially cylindrical geometry, said base having a plurality of openings directed outwardly from the curved portion thereof;
   a plurality of modules dimensioned for individual reception into said openings in a tight frictional engagement along a first direction while simultaneously being of smaller dimension than the opening along another direction whereby slippage of the module within said associated opening can be effected along said second direction; and
   securing means carried by said base and engaging portions of said modules facing outwardly from said openings to hold the same against movement in said first direction without restricting movement in said second direction whereby externally applied shocks and vibrations are converted to heat energy by frictionally opposed translations of said modules within said openings along said second direction.

2. An electrical circuit modular assembly, comprising:
   a base receiving member, said member including a plurality of mounting plates, and spaced separator walls arranged between said plates to hold same in spaced relationship to one another forming openings directed outwardly toward the periphery of said plates with adjacent walls disposed closer to one another inwardly than at the peripheral portions;
   a plurality of modules for being received within said openings and having engaging surfaces which, during reception, are in intimate frictional contacting relationship to said walls while the dimension of said modules as measured in a direction between adjacent plates is less than that between said plates thereby providing movement capabilities in a direction transversely of said plates upon being subjected to mechanical forces exceeding the frictional retaining force; and
   securing means associated with said base and said modules for directing a force against the outermost extremities of said modules to press them against the side walls of said base.

References Cited by the Examiner

UNITED STATES PATENTS 3,030,553  4/62  Comuntzis _____ 317—100

FOREIGN PATENTS 1,088,561  9/60  Germany.

JOHN F. BURNS, *Primary Examiner.*